United States Patent [19]

Holzer

[11] Patent Number: 4,727,906

[45] Date of Patent: Mar. 1, 1988

[54] GRIPLESS WATER MIXER UNIT

[76] Inventor: Walter Holzer, Drosteweg 19, Meersburg, Fed. Rep. of Germany, 7758

[21] Appl. No.: 844,029

[22] Filed: Mar. 25, 1986

[30] Foreign Application Priority Data

Apr. 3, 1985 [DE] Fed. Rep. of Germany ....... 3512116
Apr. 22, 1985 [DE] Fed. Rep. of Germany ....... 3514488

[51] Int. Cl.$^4$ ............................................. F16K 31/58
[52] U.S. Cl. ............................. 137/636.2; 137/625.17; 137/625.4; 137/616.7; 137/616; 137/801; 251/351; 251/352
[58] Field of Search ............. 137/636.2, 625.4, 625.41, 137/615, 616, 616.3, 616.5, 616.7, 801, 625.17; 251/349, 351, 352

[56] References Cited

U.S. PATENT DOCUMENTS

| | | | |
|---|---|---|---|
| 1,138,187 | 5/1915 | Bridges . | |
| 1,590,323 | 6/1926 | Schubert . | |
| 2,790,632 | 4/1957 | Mellette | 137/801 X |
| 2,980,142 | 4/1961 | Turak . | |
| 3,168,113 | 2/1965 | McJohnson | 137/616.5 X |
| 3,322,152 | 5/1967 | Aechter | 251/352 X |
| 3,468,343 | 9/1969 | Siano | 137/636.2 |
| 3,490,493 | 1/1970 | Eversman | 137/625.17 |
| 3,726,318 | 4/1973 | Hyde . | |
| 4,019,536 | 4/1977 | Dong et al. | 137/625.41 |
| 4,200,123 | 4/1980 | Brandelli | 137/625.4 |
| 4,398,668 | 8/1983 | Jette | 137/625.41 X |

FOREIGN PATENT DOCUMENTS

| | | |
|---|---|---|
| 117199 | 2/1984 | European Pat. Off. . |
| 1175048 | 7/1964 | Fed. Rep. of Germany . |
| 2144373 | 1/1974 | Fed. Rep. of Germany . |
| 3013651 | 10/1981 | Fed. Rep. of Germany . |
| 2953331 | 10/1982 | Fed. Rep. of Germany . |
| 1348265 | 5/1970 | United Kingdom . |

Primary Examiner—Alan Cohan
Assistant Examiner—John Rivell
Attorney, Agent, or Firm—Majestic, Gallagher, Parsons & Siebert

[57] ABSTRACT

In a grip-less water mixer unit, the quantity of water outflow and the mixing temperature are controlled by pivot-mounting the water outlet about two independent axes in a valve body. The water outlet is coupled to two regulating elements of which, one serves to regulate the water quantity and the other the adjustment of the mixing temperature. In a first embodiment example both regulating elements are formed as cylindrical bodies rotatable in the valve body, and in a second embodiment example, both regulating elements are concentrated in a ball which is rotatable in the valve body.

16 Claims, 15 Drawing Figures

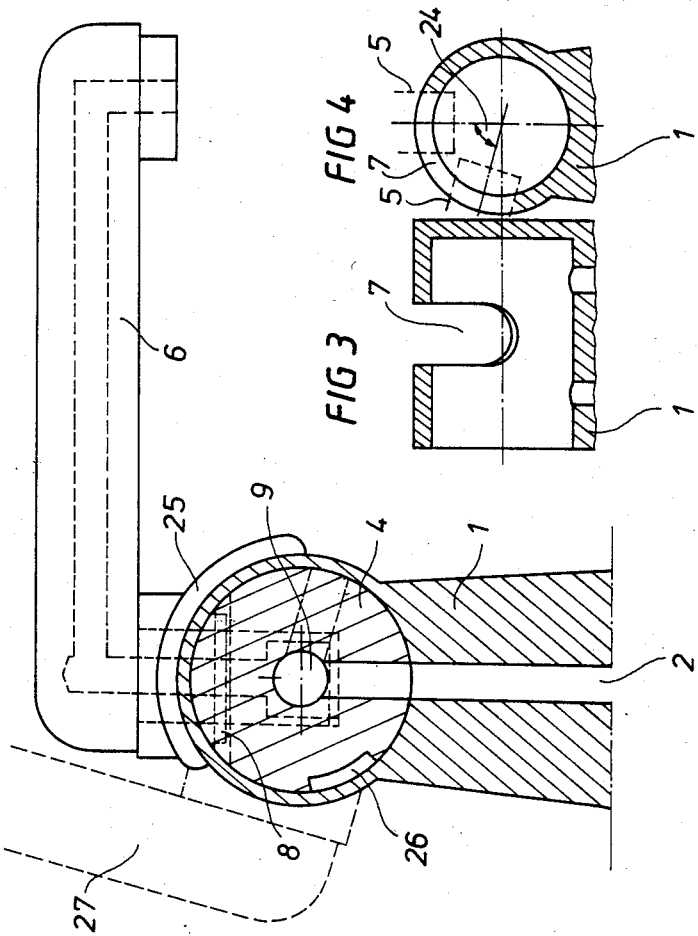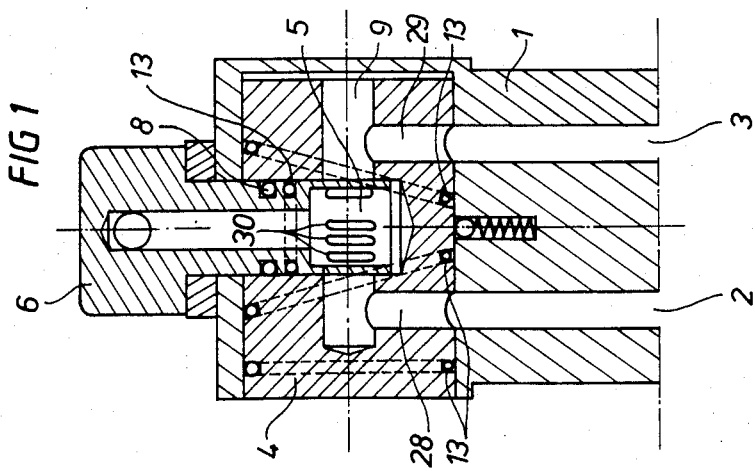

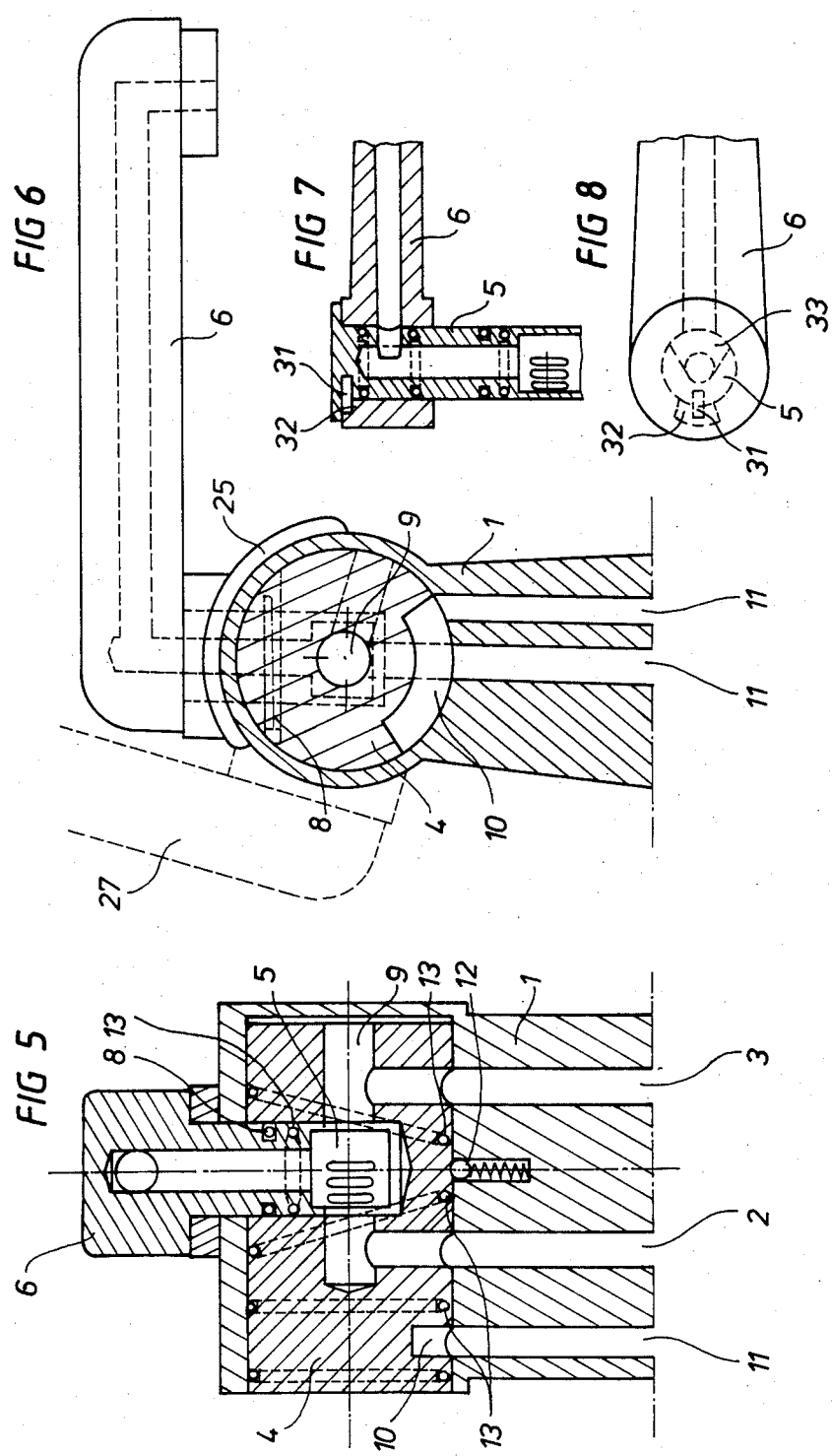

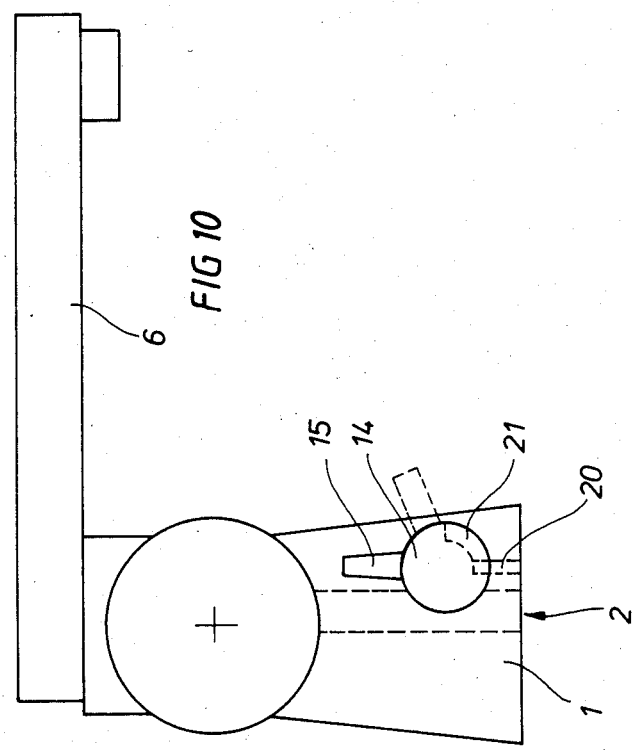
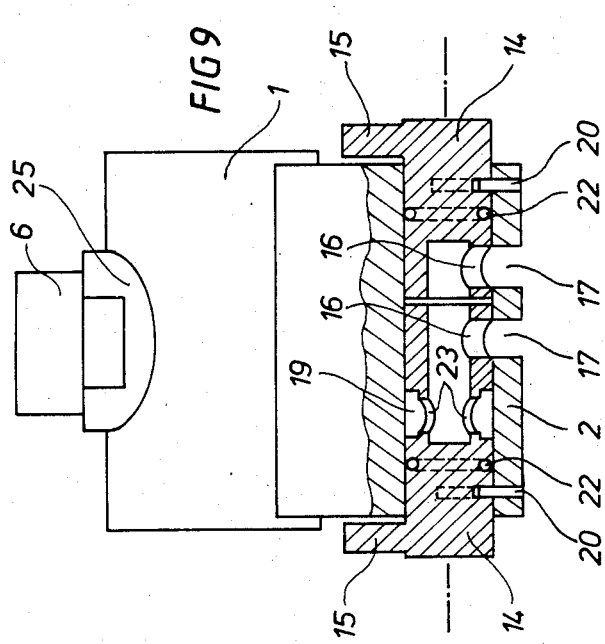
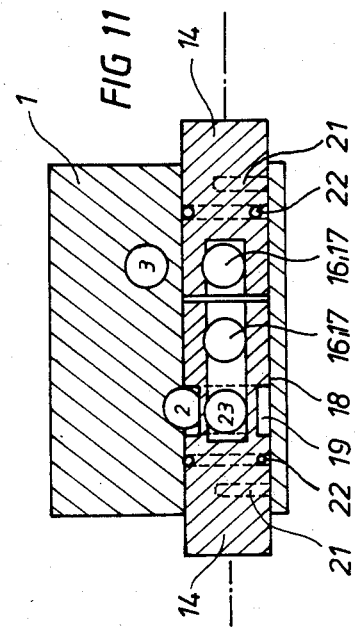

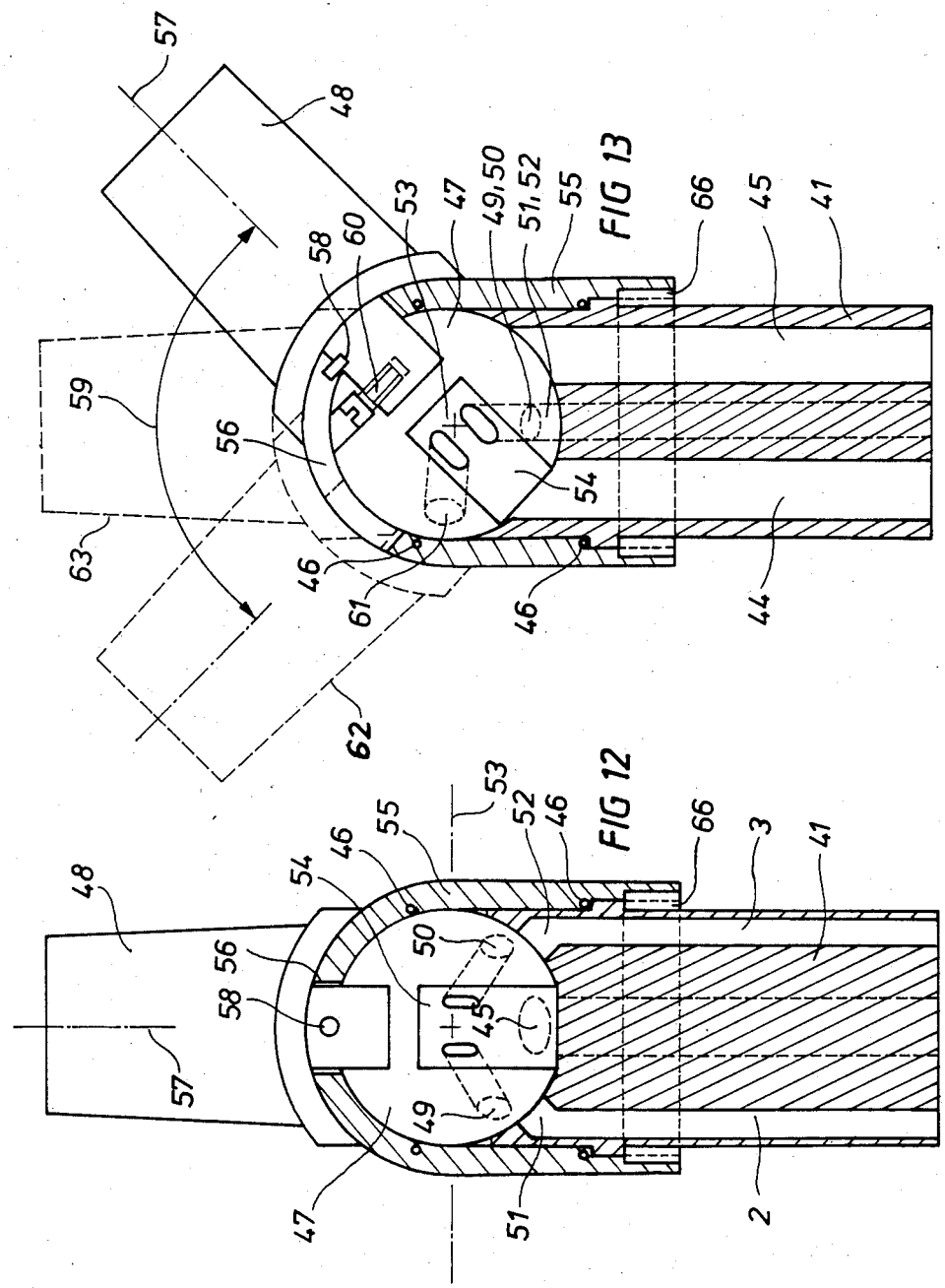

GRIPLESS WATER MIXER UNIT

BACKGROUND OF THE INVENTION

Grip-less water mixer units in which pivoting of the water outlet controls the water quantity and/or the water temperature, are easy to understand and simple to operate. In most cases the regulation is carried out by pivoting about two axes to alter both variables.

The object of the present invention is to demonstrate a particularly simple economic design which is particularly suitable for production from plastic.

BRIEF SUMMARY OF THE INVENTION

The basis is the use of component parts of essentially cylindrical shape or, optionally, of slightly conical shape to assist removal from a mould. The components are designed to be simply snapped together for ease of assembly and security of mounting. This is achieved, according to the invention, in that the regulating elements, closed on one side, are each fitted with their open side into an opening in the other part.

In this way the first regulating element, which serves to control the water quantity is fitted with its open side into the valve body. The second regulating element which controls the ratio of cold and hot water, and thereby regulates the mixing temperature of the water, is, for its part, set into it transverse to the axis of the regulating element which abuts against it, for example, in a slot in the valve body thus preventing the regulating element from falling out of the valve body. The position of the second regulating element is itself determined by, for example, a push-in securing device.

When the second regulating element is rigidly connected to the pivoting water outlet and, in some circumstances, is represented by a single component, the main assembly of the mixer unit is then completed.

A further improvement is operational convenience by the arrangement of a clearance angle between the second regulating element and the water outlet, by means of a form-fitting connection of these components, is achieved very simply by the arrangement of a clearance angle. The task of such a clearance angle is to permit a specific pivot movement of the water outlet without bringing about an alteration in function. A rigid connection of the water outlet to the second regulating element would mean an alteration in the mixing temperature. Accordingly, every pivoted position of the water outlet would give a specific ratio, i.e. a specific temperature, e.g. left=cold, right=hot, middle position=warm.

The clearance angle however, enables, for instance, a pivoting to the left for "cold" to be selected, but, by means of the clearance angle also a pivoting back to the middle position to enable the confortable washing of hands in this position. Should warmer water be required one can increase the temperature by a short pivot motion to the right, "a touch effect", but returning immediately to the middle position. A spring return to the middle position would be completely possible but it would limit the free selection of the outlet position.

The simple construction of a mixer unit in accordance with the invention also enables the operation of further water shut-offs without great difficulty. It will therefore be proposed to provide further control openings in the first regulating element which controls the water quantity, which can be made to either completely or partially close off corresponding opposing openings in the valve body.

By means of such additional regulation the water supply could be shut off for other uses, for example, washing-up machines or washing machines. This function is particularly in demand as these machines are usually connected by flexible pipes which should not be continually pressurized. The danger of a burst pipe, with its subsequent damage, is great and on the other hand the arrangement of a separate shut-off valve is difficult and gives rise to access problems.

The combination of the actual water mixer unit with such additional regulating elements gives an advantageous, simple arrangement, particularly in that this third regulating element is connected to the cold or hot water supply directly in the valve body.

A further improvement of a mixer unit in accordance with the invention consists of the provision of one or more spring detents for the positioning of the first regulating element which determines the water quantity. In this way one can, for example, select the pivot motion into an "economy position" which delivers approximately half of the water quantity. If more water is required one can overide the spring detent by somewhat firmer pressure.

Such a spring-detent could be provided, for example, before the water shut-off of the washing-up machine. In such a mixer unit the normal water outlet would be shut off first by a pivot motion into an upper detent but the supply to the washing-up machine would remain open. Only by further upward pivoting, through the detent, would the supply to the machine be cut off.

A further refinement of the invention is the combination of such a grip-less mixer unit with one or more regulating elements in the same valve body which are operated by hand grips independently from the remaining functions of the mixer unit.

Such independent regulating elements are advantageously connected directly in the valve body to the cold or hot water supplies. An extremely simple arrangement consists of forming the independent regulating elements also as a rotatable cylinder with openings which again can be positioned by turning to cover the corresponding openings in the valve body.

A further construction variant in accordance with the invention provides for the insertion, from either side, in a single through-drilling in the valve body, such as independent regulating element which, for example, intersects the cold water supply.

A fundamental improvement with reference to the necessary seals (e.g. O-rings of lip seals) will be proposed, which consists of fitting the regulating elements into an injection mould and injecting the seals singly or in groups. The current plastic techniques are in a position to offer specific materials particularly for such simple components as are necessary in the case of a mixer unit in accordance with the invention, which require practically no seals for water through-put only shut-off seals.

A further embodiment example in accordance with the invention aims to reduce the manufacturing effort during production of the regulating elements. The invention also aims not only to reduce costs by minimizing the component parts and increasing their functional versatility, but also to raise the standards of quality and reliability.

For this reason, as the primary component, a ball, or body having spherical surfaces will be proposed which, in accordance with the invention carries out several functions simultaneously, in that it is directly connected to an adjustment lever and thus serves as a mounting, but which also has openings which can be brought to overlap corresponding openings in the valve body to a greater or lesser degree by turning the ball.

Depending on the geometric arrangement of these openings and the choice of turning axis one can overlap the corresponding openings either in the same direction (i.e. the overlapping of the paired openings either simultaneously increases or decreases), or opposingly (i.e. the overlapping of one pair of openings increases and that of the other pair decreases, or vice versa).

The alteration in the same direction serves for the simultaneous opening or closing of the cold and hot water supplies and thus the regulation of the water outflow quantity. The opposing alteration serves to charge the ratio of the cold and hot water supplies and thus the mixing ratio or mixing temperature of the water outflow.

A refinement of such a mixer unit in accordance with the invention consists of arranging the ball on two rotating axes in which a rotation about a first axis gives a same-direction alteration and thus a change in the water outflow quantity, and a rotation of the ball about a second axis gives an opposing change in section and thus alters the mixing temperature.

For construction reasons and also for reasons of design it can be required to transmit one of the regulating functions to a further separate regulating element that is, for example arranged inside the ball and is connected to the adjustment lever.

A particular simplification arises from the fact that the adjustment lever is formed by the water outlet which, as such, must be connected to the regulating element, i.e. the ball and/or the regulating element, anyway. This measure also leads to fundamental economies by its versatility.

The requirement to assign specific pivot and rotational movements to the ball or regulating element gives the mounting of these elements special prominence. It will be proposed, in accordance with the invention, to mount the ball in a housing, where possible directly on the valve body. The adjustment lever, or the water outlet formed as the adjustment lever, protrudes through a guide slot which approximately follows the great circle of the ball and is led through this slot in such a manner that it can only turn the ball through a first axis. A turning of the adjustment lever in the guide slot determines the rotation of the ball or the further regulating elements about the second axis.

The necessary rotational movements are therefore independently possible and determined. The size of the angle of rotation about the first axis is given by the length of the guide slot. The limiting of the angle of rotation about the second axis is ensured by stops which are advantageously arranged in the area of the guide slot or the regulating element.

It is the aim of the invention to achieve even further functions from the same components. This is made possible in that one increases the angle of rotation by the actually required value and thereby can control other functions. In this way it is possible for example, to pivot the adjustment lever in a correspondingly lengthened guide slot out of a middle setting also into a first position whereby the mixed water flows through a first water outlet into, for example, a bath. If one pivots the adjustment lever into a second position the water can flow through a second water outlet into, for example, a hand shower.

One further example, among many, is the arrangement of an additional shut-off valve which can consist of further openings in the ball or in the regulating element in connection with corresponding openings in the valve body.

Such a shut-off valve could fulfill the valuable function, particularly in the case of a kitchen mixer unit, to simply shut off the supply to a washing-up or washing machine during long holiday absences or during repairs. The adjustment lever would then only be pivoted into the necessary setting position, whereas to shut-off the water supply to kitchen machines, it would be pivoted in a wider area.

The subject matter of the present invention arises not only from the subjects of the individual Patent Claims but also from the combination of the individual claims one with another.

All the details and features disclosed in the documents, particularly those illustrated in the layout drawings are claimed as being essential to the invention in so far as they are, either individually or in combination, new relative to the state of the art.

In the following the invention will be further explained by means of drawings illustrating several embodiment examples. Further features and advantages to the invention arise here from the drawings and their descriptions.

BRIEF DESCRIPTION OF THE SEVERAL VIEWS OF THE DRAWINGS

FIG. 1. Section through a grip-less mixer unit in front view.

FIG. 2. Section through the mixer unit according to FIG. 1 in side view.

FIGS. 3 and 4. Illustration of the valve body before the insertion of the regulating element.

FIG. 5. Section through a variant of a mixer unit in side view.

FIG. 6. Section through the mixer unit as in FIG. 5 but rotated through 90°.

FIGS. 7 and 8. Illustration of the regulating element inserted in the water outlet, in two views.

FIG. 9. Section through a further embodiment example of a valve body.

FIG. 10. Side view of the mixer unit with the valve body in accordance with FIGS. 9 and 11.

FIG. 11. Same layout as in FIG. 9, but another view.

FIG. 12. Section through a mixer unit with a ball as regulating element, plan view.

FIG. 13. Same illustration as in FIG. 12 in differing positions of regulation.

DETAILED DESCRIPTION

Figures 14, 15:
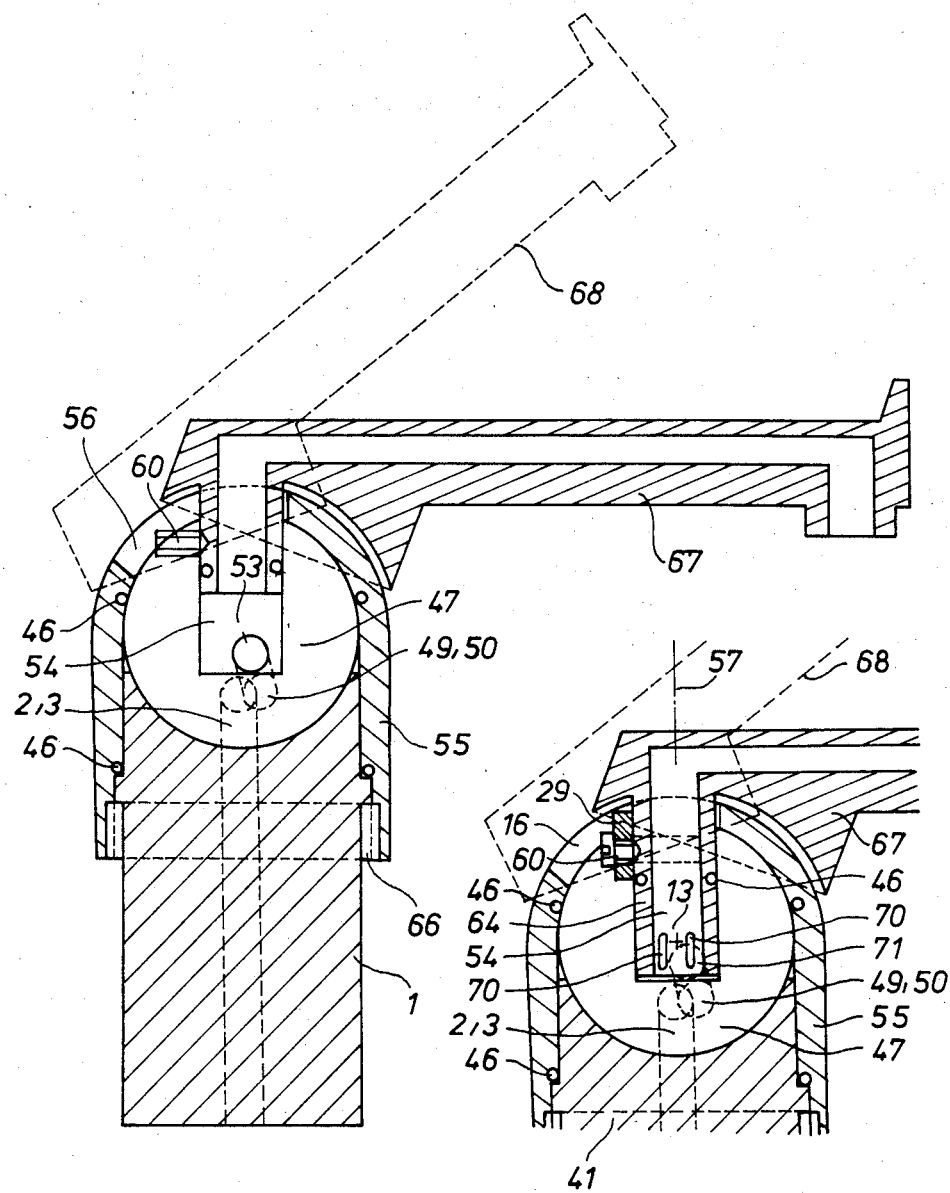
FIG. 14. Side view of a modified form of layout, sectioned.
FIG. 15. Enlarged section of FIG. 14.

FIGS. 1 and 2 illustrate schematically a construction example with the features of the invention of this Patent Application.

In the valve body (1) the cylindrical or slightly conical regulating element (4) is inserted, which is closed on one side and has a blind hole (9) only from the other side, together with radial drillings (28)(29) corresponding to the openings for the cold and hot water supplies. A further radial drilling is designed to accept the regulating element (5). In the example illustrated the regulating element is rigidly connected to the water outlet (6).

The regulating element (5) is also cylindrical and open only at one end. The other end opens into the water outlet.

To assemble the unit, therefore, the regulating element (4) must merely be inserted into the valve body which is open on one side, then the regulating element (5) is pushed into the transverse drilling of the regulating valve (4) provided, and the securing device (8) fitted in the regulating element (4). FIGS. 3 and 4 show the valve body before the insertion of the regulating element (4). The slot (7) accepts the regulating element (5) which, when inserted in accordance with FIG. 4, can be pivoted over an angle (24).

FIGS. 1 and 2 show the mixer unit in the fully-opened condition, i.e. the drillings (28)(29) in the regulating element (4) align with the openings for the cold and hot water supplies (2 and 3) in valve body (1). When the water outlet (6) is pivoted upwards, as shown by dotted lines in FIG. 2, the drillings (2 and 28) or (3 and 29) are no longer aligned and the supply of cold and hot water is cut off. Because of the high standard of the surface finish a seal can, under some circumstances, be dispensed with, however it is possible to fit round seals (26) into the regulating element (4) so that in position (27) of the water outlet (6), the water supplies (2 and 3) are closed.

The openings (30) which let in more cold or hot water depending on the pivoted position of the water outlet (6), do not, practically speaking, have to seal off completely in that the drillings (28 and 29) are fitted after them and have no shut-off function. The seals (13) are O-rings with no selection function, they are present only to prevent external leakage of water.

FIGS. 7 and 8 show, schematically, a variant of the invention in which the regulating element (5) is connected to the water outlet in a form-locking fashion, i.e. with a clearance angle.

FIGS. 7 and 8 show the regulating element (5) rotatably inserted onto the water outlet (6). The dog (31) of the regulating element (5) fits into a segment-shaped cut-out (32) in the water outlet (6) and, when pivoted moves the regulating element (5) only at the end of the clearance angle. The drilling (33) widened at an angle enables unrestricted outlet of the water from the regulating element (5) into the water outlet (6). The clearance angle makes it possible, on the one hand, to influence the temperature of the water with the water outlet (6) but, despite this, after the desired temperature adjustment, to return the water outlet (6) to the middle position without altering the temperature setting.

FIGS. 5 and 6 show a further example of the numerous construction variations in accordance with the invention. In this schematically illustrated example, the operation of a further, in itself independent, water outlet is shown. For this purpose a further control opening (10) in the form of a segment is arranged in the regulating element (4) with corresponding openings (11) in the valve body (1). During normal use of the unit the connection between both openings (11) is permanently open. Only when the water outlet is pressed into its extreme pivoted position (27), is the end of the segment-shaped control opening (10) reached and thus the connection is closed. This extreme pivot position is blocked by the previously-mentioned detent (12) against inadvertant cutting-off of the water supply between the two openings (11).

This additional arrangement is only described as an example, the operation of shutting-off of a sprinkler system or similar is equally possible.

FIGS. 9 to 11 show another extension of the inventive principle which is classified as integral and unified.

In this example two further independent regulating elements (14) with their operating grips (15) are arranged in the same valve body (1). Here the regulating elements (14) are again cylindrical and are mounted in a through-drilling (18) in the valve body (1). This drilling (18) directly intersects the cold water supply (2).

In this way both regulating elements receive cold water through the annular slot (19) and the transverse drilling (23).

The openings (16) correspond with the openings (17) in the valve body (1) and permit flow of cold water in the position of the regulating element (14) shown. When the operating grip (15) is pivoted into the position shown by dotted lines in FIG. 10, the cylinder wall of the regulating element (14) restricts the outlet of water.

The regulating elements (14) are fixed in a segment slot (21) by stops, which also limit the pivot movement. The sealing rings (22) prevent external leakage of water.

The quoted descriptions of the inventive idea are only to be understood as examples in no way limiting the numerous further possibilities. The method of covering the slot (7) in which the regulating element (5) pivots, by a cover (25) belongs also to the development possibilities.

Likewise, the possiblity of injecting some of the O-rings which are seated on almost the same diameters, together with the round seals (26) (as shown in FIG. 2) also counts as part of the inventive idea in that this possibility only exists by the speciality of this construction.

In the following embodiment examples the regulating element is formed as a ball.

In FIGS. 12 and 13 an example of an embodiment of a mixer unit is described. It must be explained first that it concerns only one example, which should in no way limit the significance or extent of the invention.

The essential element, the ball (47) is, in this case enclosed in a housing (55) and mounted in form-locking fashion directly on the valve body (41). The locking ring (66) connects the housing (55) to the valve body (41).

In FIG. 12, the cold water supply (2) and the hot water supply (3) are to be recognised as the openings (51) and (52). The ball (47) contains the corresponding openings (49 and 50) which open out into the mixing chamber (54). The necessary O-ring seals are identified as (46).

FIG. 12 shows the mixer unit in the middle position (63) of the adjustment grip (49) corresponding to the switched-off condition of the unit, whereas FIG. 13 shows the same unit in a switched-on condition. The cold water reaches the mixing chamber (54) through the cold water supply (2) and the openings (51 and 49), into which the hot water also enters from the hot water supply (3) through the openings (52 and 50) and in which they are mixed to flow out of the water outlet (44).

The adjustment grip (48) is inserted into the ball (47) and connected rigidly to it by the screw (60). The adjusting grip is moveable in the guide slot (56) about the first axis (53) as far as the position (82). The adjustment grip (48) or water outlet (44) forming the adjustment grip protrudes through a guide slot (56) which approximately follows a great circle of the ball (47), out of the housing and is so guided by this slot that the ball itself can only rotate about the first axis (53). A turning of the adjustment grip (48) in the guide slot (56) determines the rotation of the ball (47) or the further regulating elements (64) about the second axis (57).

The necessary rotational movements are thereby independently possible and determined. The size of the angle of rotation about the first axis (53) is given by the length of the guide slot (56). The limiting of the angle of rotation about the second axis (57) is ensured by stops (58) which are advantageously arranged in the area of the guide slot (16) or the regulating element (24).

It is also rotatable about the second axis (57) and thus aligns the openings (49 and 50) in the opposing direction with the openings (51 and 52) to a greater or lesser degree for overlapping.

In the section of the projection of FIG. 13 the cut-out openings (49 and 51) overlap with the illustrated openings (50 and 52). The position illustrated would mean in the case of a middle setting (63) the mixing of the same quantities of cold and hot water in which the mixed water runs into a bath through the water outlet (44). If one pivots the adjustment grip (48) into the position shown by dotted lines in FIG. 2, the water can reach, for example, a hand shower through the water outlet (45).

In a position (62) shown by dotted lines, of the adjustment grip (48) the additional opening (61) at least partially overlaps the opening (51) and thus cold water reaches the outlet (45) through the mixing chamber (54). This illustration merely shows the flexible possibilities of a device according to the invention in order to achieve other useful functions. In this style, for example, a bath and shower unit with regulatable cold and hot water supplies could be built up.

FIG. 14 shows a variant of a mixer unit according to the invention in which the water outlet (67) is provided as an adjusting grip (48). To switch off, the water outlet (67) is brought into the position (68). All common parts are identified by index numbers of FIGS. 12 and 13.

FIG. 15 shows a section of FIG. 14, however, in this case with a further regulating element (64) which is rigidly connected to the water outlet (67). In this variant, the ball (47) is only pivotable about the axis (53) and is secured against any other turning movements by the shoulder (69).

The sleeve-shaped regulating element (64) is pivotable in the ball (47) about the axis (57) and has openings (70) which can be brought to overlap, to a greater or lesser degree, opposingly, the corresponding openings (71) in the ball, to alter the mixing ratio of the cold and hot water. The arrangement of a cylindrical regulating element (64) has the advantage of an easier estimation and linearity of the regulating setting. Additionally the machining of such a simple cylinder can rationalize the production.

With the described embodiment examples the possibilities of the inventive idea are in no way exhausted and numerous other variants can be deduced from the Figures.

I claim:

1. A grip-less mixer unit, from metal or plastic, including a valve body; at least one each of hot and cold water supplies; first and second regulating elements for the regulating, respectively, of the mixing temperature and the quantity of the water outflow; and a water outlet pivotable about one or two axes for operation of the regulating elements, where said second regulating element is positioned transversely to said first regulating element, and said outlet is connected to said first and second regulating elements and that by rotating the outlet about one of said axes, said quantity of water may be regulated, and by rotating the outlet about the other of said axes, said mixing temperature of the water may be regulated.

2. A mixer unit according to claim 1 characterized as: that as a regulating element, a rotatably mounted ball (47) or a body having spherical surfaces is present and which is connected to an adjustment grip (48) in which the ball (47) has openings (49 and 50) for cold and hot water which are arranged in the valve body (1) with the corresponding openings (51 and 52) for cold and hot water.

3. Device according to claim 2, characterized as: that the openings (49 and 50) for cold and hot water are so arranged in the ball (47) that by rotation of the ball (47) about a first axis (53) they, in the same direction as their overlap with the openings (51 and 52), increase or decrease; and by rotation of the ball (47) about a second axis (57), after their overlap opposingly.

4. Device according to claim 2, characterized as: that the openings (49 and 50) for cold and hot water in the ball (47) are so arranged that by rotation of the ball (47) about a first axis (53) they, in the same direction as their overlap, with the openings (51 and 52), increase or decrease and a further regulating element is present, the rotation of which about a second axis (57) alters the supply line cross-section for cold and hot water opposingly.

5. Device according to claim 2, characterized as: that the adjustment grip (48) is formed as the water outlet (54), and is connected to the ball (47) and/or the further regulating element (64).

6. Device according to claim 2, characterized as: that the ball (47) or body with spherical surfaces, is mounted in a housing (55), and the adjustment grip (48) is so guided in a guide slot (56) in the housing (55) which approximately follows the great circle of the ball (47), that only one pivot movement of the ball (47) about the first axis (53) is possible, in which a turning of the adjustment grip (48) in the guide slot (56) turns the ball (47) and/or the further regulating element (64) about the second axis. (57).

7. Device according to claim 6, characterized as: that in the area of the guide slot (56) and/or the further regulating element (64), stops (58) are present which limit the angle of rotation of the adjustment grip (48) about the second axis (57).

8. A grip-less mixer unit from metal or plastic including a valve body; at least one each of hot and cold water supplies; at least a first regulating element and a second regulating element for the regulating of quantity and mixing temperature of the water outflow; and a water outlet pivotable about two axes for operation of the regulating elements, characterized as: that said first and second regulating elements are mainly cylindrical in shape, optionally slightly conical; and the first regulating element, which serves to regulate the water quantity, is closed on one side and is inserted with its open side into the valve body; and the second regulating element, which serves to regulate the mixing temperature, is inserted transversely in the first regulating element whereby it abuts the valve body and thus determines the position of the first regulating element in the valve body; and that the second regulating element is itself retained in its position by a securing device, with the outlet connected to said first and second regulating elements such that by rotating the outlet about one of said axes, said quantity of water may be regulated, and by rotating the outlet about the other of said axes, said mixing temperature of the water may be regulated.

9. Mixer unit according to claim 8, characterized as: that the second regulating element is fitted either rigidly or in a form-locking fashion to the pivoting water outlet, for allowing control of said water temperature by movement of said water outlet, and further allowing movement of said water outlet within a certain range without altering said temperature.

10. Mixer unit according to claim 9, characterized as: that the form-locking between the second regulating element and the pivotable water outlet has a clearance angle.

11. Mixer unit according to claim 8, characterized as: that the first regulating element has further control openings which correspond with further opposing openings in the valve body.

12. Mixer unit according to claim 8, characterized as: that the first regulating element in the valve body includes a spring-detent, for providing at least one detent position for the pivoting of said water outlet about said one of said axis.

13. Mixer unit, from metal or plastic including a valve body; at least one each of hot and cold water supplies; at least a first regulating element and a second regulating element for the regulating of quantity and mixing temperature of the water outflow; and a water outlet pivotable about one or two axes for operation of the regulating elements, characterized as: that said first and second regulating elements are mainly cylindrical in shape, optionally slightly conical; and the first regulating element, which serves to regulate the water quantity, is closed on one side and is inserted with its open side into the value body; and the second regulating element, which serves to regulate the mixing temperature, is inserted transversely in the regulating element whereby it abuts the valve body and thus determines the position of the first regulating element in the valve body; and that the second regulating element is itself retained in its position by a securing device, and further characterized in that at least one further independent regulating element is provided with an operating grip and arranged in the valve body.

14. Mixer unit according to claim 13, characterized in that said at least one further independent regulating element is connected in the valve body to the cold water supply.

15. Mixer unit according to claim 13, characterized in that said at least one further independent regulating element is a rotatable cylinder with openings which can be overlapped with corresponding openings in the valve body by turning.

16. Mixer unit according to claim 13, characterized in said at least one further independent regulating element is arranged in a through drilling which intersects the cold water supply.

* * * * *